May 2, 1961 D. W. LEWIS 2,982,757
STYRENYL ORGANOSILICON MONOMERS AND POLYMERS THEREOF
Filed Oct. 20, 1955
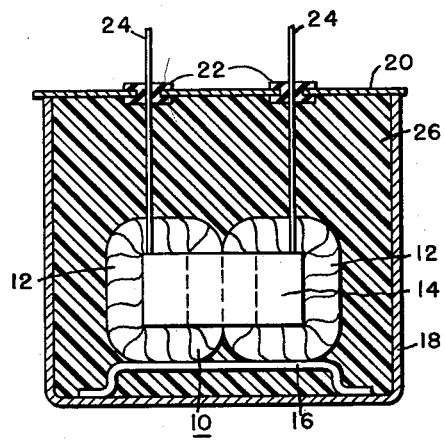
WITNESSES
Wm. B. Sellers.
William G. Addison
INVENTOR
Daniel W. Lewis.
BY
ATTORNEY

United States Patent Office 2,982,757
Patented May 2, 1961

2,982,757
STYRENYL ORGANOSILICON MONOMERS AND POLYMERS THEREOF

Daniel W. Lewis, Pittsburgh, Pa., assignor to Westinghouse Electric Corporation, East Pittsburgh, Pa., a corporation of Pennsylvania Filed Oct. 20, 1955, Ser. No. 541,573

4 Claims. (Cl. 260—46.5)

The present invention relates to novel styrenyl organosilicon monomers and to their preparation, and further to the conversion of such monomers to organopolysiloxane liquids and then to thermoset resinous solid compositions.

Organosilicon compositions are used quite extensively in the electrical industry, particularly as insulating materials for various types of electrical apparatus and equipment. The use of such compositions as insulating materials is desirable due to their extremely high thermal stability characteristics.

Organopolysiloxanes containing vinyl groups attached directly to silicon atoms have been used heretofore as impregnating resins. Due to their relative unreactivity, however, such siloxanes exhibit air inhibition to such a degree that they cannot be employed conveniently where there is a large surface-to-volume ratio in the total amount of siloxane which is to be thermoset.

The object of the present invention is to provide organosilicon monomers having styrenyl groups, monovalent hydrocarbon radicals, and monovalent hydrolyzable groups attached directly to the silicon atoms, said monomers being readily hydrolyzable to organopolysiloxanes which will cure rapidly to thermoset solids.

Another object of this invention is to provide linear organopolysiloxanes having styrenyl groups and monovalent hydrocarbon radicals directly attached to silicon, said organopolysiloxanes being readily reactive to form void-free thermoset resinous homopolymer and copolymer solids.

Other and further objects of the invention will, in part, be obvious and will, in part, appear hereinafter.

For a more complete understanding of the invention reference is made to the following detailed description, taken in conjunction with the accompanying drawing, in which the single figure thereof is a view in elevation, partly in cross section, of a transformer, the casing of which is filled with the insulating filling compound of this invention.

In accordance with the present invention and in the attainment of the foregoing objects, there are provided organosilicon monomers having the formula:

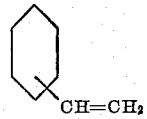

wherein R represents a monovalent hydrocarbon radical free from aliphatic unsaturation, X represents a monovalent hydrolyzable group, and $n$ has a value of from 1 to 2.

The hydrocarbon radicals, represented by R, are monovalent radicals selected from the group consisting of alkyl radicals having not more than four carbon atoms including methyl, ethyl, n-butyl, isobutyl, n-propyl, and isopropyl, and the like, and aromatic radicals including benzyl, phenyl, and the like.

The hydrolyzable groups, represented by X, may be either alkoxy, aryloxy, halogeno, acyloxy, or amino. When the hydrolyzable group is an alkoxy material, the alkyl radical may be either primary, secondary or tertiary, for example, methyl, ethyl, propyl, butyl, isopropyl, isobutyl, secondary butyl, tertiary butyl, hexyl, and the like. When the hydrolyzable group is an aryloxy group, the aryl radical may be a phenyl radical or a substituted phenyl radical. In place of the alkoxy and aryloxy groups just described, any of the halogens, an acyloxy or an amino radical may be used as the hydrolyzable group in accordance with this invention. When the hydrolyzable groups comprise alkoxy groups it is preferred to use those materials in which the alkyl radical is primary and contains from 1 to 8 carbon atoms per molecule.

The term "styrenyl radical" as used in the instant specification and in the appended claims refers to the radical

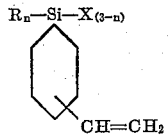

attached directly to a silicon atom.

To illustrate the preparation of organosilicon monomers which are suitable for use in accordance with the present invention, the following examples are set forth:

Example A

An ether solution of p-ethylphenylmagnesium bromide, prepared by the reaction of 8 mols (1483 grams) of p-ethylbromobenzene with 200 grams of magnesium, was added with stirring and cooling to 11 moles (37% excess) of silicon tetrachloride dissolved in 4 liters of dry benzene. The temperature of the reaction mixture was kept below 10° C. by means of an ice bath. Salts which precipitated were filtered off and the filtrate was freed of solvents and excess silicon tetrachloride by distillation at atmospheric pressure. Vacuum distillation resulted in a 60% yield of trichloro-p-(ethyl)phenylsilane having a boiling point of 75° to 76° C. at a pressure of 0.8 mm. of mercury. The density at 25° C. is 1.244 gm./cc. Theoretical silicon content of this silane is 11.69%. Actual values of silicon found were 11.97% and 12.02%.

Four moles of the silane thus prepared were chlorinated by passing chlorine gas into the liquid which was illuminated by two fluoroscent lamps. Chlorination was stopped when the silane had gained 75% of the weight required for monochlorination. This precaution was taken to limit the amount of dichlorinated product formed. The chlorinated mixture was distilled to give 0.6 mole of unchlorinated starting material. The residue containing the desired product was vacuum distilled to give 3 moles of trichloro-p-(chloroethyl)phenylsilane having a boiling point of 87–88° C. at a pressure of 0.4 mm. of mercury. The theoretical silicon content of this material is 10.22%. The silicon values actually found were 10.37% and 10.52%.

Seven hundred and fifty-five grams (2.75 moles) of trichloro-p-(chloroethyl)phenylsilane were introduced dropwise into a short path distillation flask which was heated to 500° to 550° C. At the same time a very slow stream of nitrogen was passed through the system. HCl was readily split off giving 648 grams of crude product. On redistillation, 551 grams (85% yield) of trichloro-p-styrenylsilane was obtained having a boiling point of 60° C. at a pressure of 0.6 mm. of mercury. The density of this silane at 25° C. was 1.282 gm./cc. The theoretical silicon content of this silane is 11.79%. Actual values of silicon found in two determinations were 11.99% and 12.04%.

Two moles of trichloro-p-styrenylsilane, dissolved in an equal volume of dry benzene, were added dropwise into 1.5 liters of dry methanol which had been saturated with dry ammonia gas. During the addition, ammonia gas was passed in slowly to make certain that HCl would be neutralized as soon as it was formed. The temperature of the reaction mixture was kept at 0° C. by means of an ice bath. Ammonium chloride which precipitated was filtered off and the filtrate was distilled giving 450 grams of liquid boiling at 75–90° C. at a pressure of 0.2 mm. of mercury. This was redistilled giving 377 grams of trimethoxy-p-styrenylsilane having a boiling point of 66.5° C. at a pressure of 0.1 mm. of mercury. The density of this silane was 1.057 gm./cc. at 25° C. The calculated silicon content is 12.50%. The actual values of silicon found were 12.52% and 12.61%.

The trifunctional monomer thus prepared may be converted to a dialkoxy monomer, as described in Example B, and then to a monoalkoxy monomer, as described in Example C, below.

Example B

An ether solution of 1 mole of methylmagnesiumbromide was added with stirring and cooling to a benzene solution of 1 mole of trimethoxy-p-styrenylsilane. The salts which precipitated were filtered off. The filtrate was freed of ether and benzene by distillation first at atmospheric pressure and then at slightly reduced pressure. A small amount of ditertiary butyl hydroquinone was then added to the residue to inhibit polymerization during subsequent distillation of the product. The dimethoxymethylstyreneylsilane product distilled at 60° C. at a pressure of 0.5 mm. of mercury. It had a refractive index of $N_D^{25}$ 1.5111 and a density of 1.005 gm./cc. at 25° C. The calculated silicon content of this product is 13.46%. The actual silicon values found were 13.33% and 13.25%.

Example C

An ether solution of 0.5 mole of methylmagnesium bromide was added with stirring and cooling to 0.5 mole of dimethoxymethylstyrenylsilane dissolved in to 600 cc. dry benzene. Salts which precipitated were filtered off. The filtrate was freed of solvent by distillation using mild heating under vacuum. A small amount of ditertiary butyl hydroquinone was added before this distillation to inhibit polymerization of the product during distillation. The methoxydimethylstyrenylsilane obtained boiled at 42–43° C. at a pressure of 0.08 mm. of mercury, had a refractive index of $N_D^{25}$ 1.5179, and a density of 0.953 gm./cc. at 25° C. The calculated silicon content of methoxydimethylstyrenylsilane is 14.58%. Actual values of silicon found were 14.50% and 14.51%.

The organosilicon styrenyl monomers, such as may be prepared in accordance with the procedure just described, may be converted to liquid organopolysiloxanes by hydrolyzing and condensing the monomers through the hydrolyzable groups thereon. The liquid organopolysiloxanes then may be converted to solid thermoset resins by polymerizing the organopolysiloxanes through the olefinically unsaturated hydrocarbon radicals thereon by heating the organopolysiloxanes in the presence of one or more vinyl addition type polymerization catalysts.

The liquid organopolysiloxanes may be prepared by hydrolyzing the monomers and equilibrating the hydrolyzate with a mineral acid such as 50% to 100% sulfuric acid or hydrochloric acid or with an alkali such as sodium hydroxide, potassium hydroxide, or a quaternary ammonium base such as trimethylbenzylammonium hydroxide. The hydrolysis and equilibration may be carried out more or less simultaneously by adding, for example, 80% sulfuric acid to the organosilicon monomers. If the monomers include a halogen, chlorine for example, then the addition of water or crushed ice to the monomer mixture will evolve sufficient halogen acid to provide for rapid hydrolysis and equilibration of the hydrolyzate to the desired polysiloxane condensate. The polysiloxane then may be separated readily from admixture with the water and equilibrating medium.

The use of an organic solvent facilitates the separation of the polysiloxane, the solvent itself being readily removable subsequently by evaporation or the like, thereby leaving the polysiloxane. The volatile organic solvent employed in the hydrolytic reaction preferably is one in which both the monomers and the resultant hydrolytic products are soluble. Examples of suitable solvent materials include benzene, toluene, xylene, diethyl ether, methanol, ethanol, propanol, and the like. The amount of solvent employed is not critical. However, the more dilute the solution the less viscous will be the resulting products comprising the fluid organopolysiloxanes.

The organosilicon monomers of this invention may be hydrolyzed either alone or in admixture with one or more other hydrolyzable organosilicon monomers to produce liquid copolymeric organopolysiloxanes. Such other hydrolyzable organosilicon monomers which may be hydrolyzed with the monomers of this invention have the general formula:

$$R_n-Si-X_{(4-n)}$$

wherein R, X and n have the meanings previously given.

Thus, by admixing, hydrolyzing, and equilibrating three moles of the monomer of Example B, with one mole of methylphenyldichlorosilane and two moles of trimethylchlorosilane, a siloxane is obtained having the following structural formula:

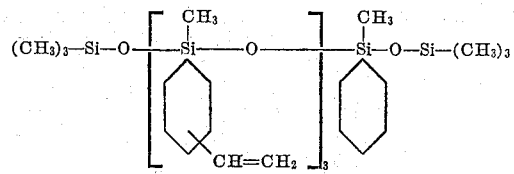

Many different linear organopolysiloxanes may be prepared by hydrolyzing and equilibrating the organosilicon monomers of this invention with the other monomers illustrated above. The resulting siloxanes will have the following structural formula:

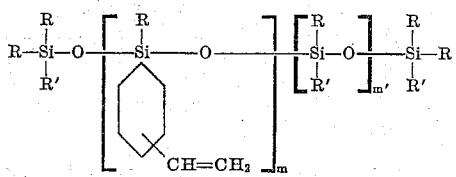

wherein R has the meaning given hereinabove, R' represents a radical selected from the group consisting of monovalent hydrocarbon radicals and styrenyl radicals, m has an average value of at least one, and m' is zero or has an average value of at least one.

When m in the above formula has an average value of from 1 to 5 the siloxanes have a relatively low viscosity, i.e., from about 10 to 50 centistokes at 25° C. Such siloxanes, because of their low viscosity, are particularly suitable for use as impregnating liquids. They also may be admixed with organosiloxane liquids of higher viscosity to reduce the viscosity of the latter.

Siloxanes wherein m has a value of higher than 5 may have viscosities up to about 5000 poises. Such siloxanes are particularly suitable for use as an electrically insulating adhesive or binder for bonding mica flakes together to form electrical insulating tapes.

The organopolysiloxanes obtained upon hydrolysis of the monomers in the manner described above may be polymerized or cross-linked to solid thermoset resins by heating the siloxanes to about 80° C. to 150° C. for about one to four hours in the presence of one or more vinyl addition type polymerization catalysts. Suitable examples of such catalysts include benzoyl peroxide, lauroyl peroxide, methyl ethyl ketone peroxide, t-butyl hydroperoxide, di-t-butyl peroxide, di-cumyl peroxide, ascaridole, tert-butyl perbenzoate, di-t-butyl diperphthalate, and ozondies. The catalysts generally should be used in an amount of from 0.1% to 2% by weight, although somewhat larger or smaller amounts may be employed if desired. Polymerization accelerators such as cobalt naphthenate and azomethines also may be employed. Polymerization of the styrenyl organopolysiloxanes also may be effected through the application of actinic light thereto.

Furthermore, the organopolysiloxanes may be converted to thermoset resins, without any added catalyst, by subjecting them to radiation of high frequency including gamma rays or electron beam radiation such as may be obtained from a Van de Graaff generator or from a radioactive substance such as radioactive cobalt which emits both electrons and gamma rays. Thus, the liquid organopolysiloxanes may be subjected to electron beam radiation of at least 0.05 m.e.v. to apply from 2 to 50 megarep. to produce solid polymers.

It is desirable to incorporate a relatively small proportion of one or more polymerization inhibitors in the hydrolyzed product to aid in extending its storage or shelf-life by preventing premature polymerization. Inhibitors which are suitable for this purpose include substituted phenols and aromatic amines. More specific examples of suitable polymerization inhibitors include hydroquinone, resorcinol, tannin, and sym. alpha, beta naphthyl-p-phenylene diamine, and N-phenyl beta naphthylamine. The inhibitor should be used in only relatively small proportions. Thus, amounts less than about 1.0% should be used, with amounts as small as about 0.01% to about 0.1% generally being sufficient.

In addition to being polymerized in the manner described above the liquid organopolysiloxanes may be copolymerized by dissolving from 5% to 95% by weight of the same in from 95% to 5% by weight of a liquid reactive unsaturated monomer having the group $>C=C<$. Upon heating in the presence of a vinyl-type addition catalyst the solution will set up in the form of a hard, cured thermoset resin.

Examples of liquid reactive unsaturated monomers having the group $>C=C<$ which are suitable for use in accordance with this invention, include monostryrene, vinyl toluene, alphamethylstyrene, 2,4-dichlorostyrene, paramethyl styrene, vinyl acetate, methyl methacrylate, ethyl acrylate, diallyl phthalate, diallyl succinate, diallyl maleate, methallyl alcohol, acrylonitrile, methyl vinyl ketone, diallyl ether, butyl methacrylate, allyl acrylate, allyl crotonate, 1,3-chloroprene, and divinyl benzene, as well as mixtures of any two or more of these monomers.

The following examples are set forth to illustrate even more fully the manner in which the monomers of this invention may be utilized in preparing liquid organopolysiloxanes and thermoset resinous polymers. The parts given are by weight unless otherwise indicated.

*Example I*

One half mole of methoxydimethylstyrenylsilane dissolved in 125 parts of ethyl ether was stirred with 125 parts of 5% sulfuric acid for three hours. The organic layer which formed was withdrawn and washed free of acid. It was dried over anhydrous sodium sulfate and ether was removed by distillation. The residue was distilled at 0.05 mm. pressure, the residue boiling at 115° to 116° C. The calculated silicon content of this disiloxane is 16.57%. Values found for silicon were 16.61% and 16.75%. This disiloxane had the following formula

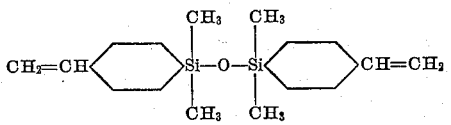

This disiloxane may be polymerized to a void-free solid by heating at 100° C. with about 0.5% by weight of ditertiary butyl peroxide.

*Example II*

Three-tenths of a mole (62.4 parts) of dimethoxymethylstyrenylsilane and 0.2 mole (20.8 parts) of methoxytrimethylsilane dissolved in 100 parts of ethyl ether were stirred with 125 parts of 5% sulfuric acid. Stirring was continued for two hours after which 200 parts of ice and water were added to the stirred mixture. The ether solution which separated was withdrawn, washed free of acid, and dried over anhydrous sodium sulfate. Ether was removed under vacuum at room temperature leaving 49 parts of a fluid having the composition

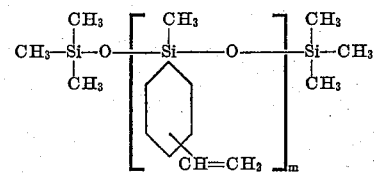

The average value of $m$ in this liquid composition was 3 and the liquid had a viscosity of 0.4 poise at 25° C.

The viscosity of the liquid siloxane of Example II is quite low and it is quite suitable for the impregnation of electrical members. The liquid siloxane also has a relatively low vapor pressure whereby it may be admixed with a polymerization catalyst, prior to impregnation, and cured to a solid resin. For example, a sample of the siloxane of Example II, when admixed with 0.5% by weight of ditertiary butyl peroxide, gelled to a void-free solid polymer after being heated at 100° C. for one hour. The liquid siloxane of Example II may be applied to electrical coils, transformers and other members by impregnation and thereafter it may be cured by heat or irradiation to a solid resinous material to provide insulation for the electrical members.

*Example III*

The process of Example II is repeated using, in addition, 0.2 mole of dimethoxydimethylsilane. The resulting siloxane is a liquid of substantially the same viscosity as the siloxane obtained in Example II.

*Example IV*

The process of Example II is repeated using only 0.1 mole of methoxytrimethylsilane plus 0.1 mole of dimethoxydimethylsilane in place of 0.2 mole of methoxytrimethylsilane. The siloxane obtained upon hydrolysis and equilibration of the silane mixture has a viscosity which is somewhat higher than that of the siloxane of Example II.

*Example V*

Equal moles of methoxydimethylstyrenylsilane and dimethoxymethylphenylsilane dissolved in benzene were stirred with a stoichiometric excess of 5% sulfuric acid for three hours. The benzene solution of the polysiloxane was withdrawn, washed free of acid, and dried over anhydrous sodium sulfate. Upon evaporation of the solvent there remained a liquid having the following composition

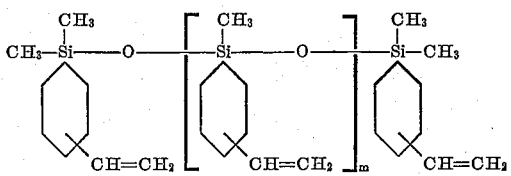

wherein $m$ had an average value of 2. This liquid had a viscosity of 45 centipoises at 25° C.

A sample of this liquid, when admixed with 0.5% ditertiary butyl peroxide, gelled to a void-free thermoset solid after heating for one hour at 100° C.

Equal parts of the liquid siloxane of Example V and monostyrene gelled to a clear solid when admixed with 0.5% ditertiary butyl peroxide and heated at 80° C. for one hour.

The liquid siloxane of Example V, either in its homopolymerized cured form or copolymerized with styrene, may be used as insulation for many kinds of electrical members. Thus, the resinous compositions of this invention are suitable for making resinous compositions and members of many kinds. For example, they may be used in the preparation of laminates, moldings, and the like which may be produced by applying coatings of the liquid siloxanes to sheets of asbestos cloth, glass cloth or the like and then curing by exposure to irradiation or under heat and pressure. Furthermore, they may be used in preparing cast members by pouring the resinous compositions into a mold and then curing to shape to form knife handles, and other utensils, boats, household articles and appliances, and the like. The compositions also have utility as potting resins for use in preparing transformers and electronic equipment of many kinds.

Referring to the drawing, there is illustrated an encased transformer 10. The transformer comprises a plurality of cores 12, associated with a coil 14, all mounted on a base 16. The transformer is disposed within a casing 18 which may be of metal, porcelain, or other suitable material. A cover 20 attached to the casing 18 is provided with insulating bushings 22 through which pass conductors 24 from the electrical coil 14. The casing is filled with the solid insulating compound 26 of this invention.

The compositions of this invention are particularly suitable for use as resinous materials for encapsulating various kinds of electrical equipment. Finely divided inorganic flake-like materials such as mica flakes, when introduced in amounts within the range of about 25% to 75% by weight of the siloxane composition, impart improved thixotropic properties to the compositions of this invention. Other finely divided inorganic materials such as silica, asbestos, glass or the like may be used to impart thixotropic properties to the compositions, and to provide compositions of desired strength and toughness.

Electrical apparatus may be encapsulated, using the compositions of this invention, in accordance with any of the encapsulating procedures in commercial practice. Thus, the compositions may be employed in the process disclosed in U.S. application, Serial No. 225,808, copending herewith. In addition to the foregoing, the compositions of this invention may be applied as coatings and impregnants to coils and the like by conventional dipping and surface coating procedures.

While the present invention has been described with reference to particular embodiments and examples, it will be understood, of course, that modifications, substitutions and the like may be made therein without departing from its true scope.

I claim as my invention:

1. A linear organopolysiloxane having the formula

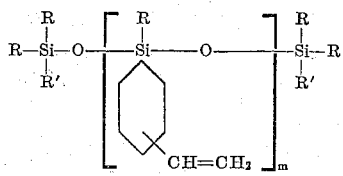

wherein R represents a monovalent hydrocarbon radical free from aliphatic unsaturation, R' represents a radical selected from the group consisting of monovalent hydrocarbon radicals free from aliphatic unsaturation and vinylphenyl radicals, and $m$ has an average value such that said linear organopolysiloxane has a viscosity within the range of from 0.1 to 5000 poises at 25° C.

2. A linear organopolysiloxane having the formula

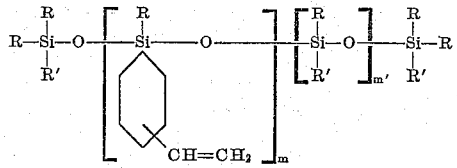

wherein R represents a monovalent hydrocarbon radical free from aliphatic unsaturation, R' represents a radical selected from the group consisting of monovalent hydrocarbon radicals free from aliphatic unsaturation and vinylphenyl radicals, and $m$ and $m'$ each have an average value such that said linear organopolysiloxane has a viscosity within the range of from 0.1 to 5000 poises at 25° C.

3. An electrical member comprising an electrical conductor and a body of solid insulation applied thereto, said insulation comprising the solid thermoset resin obtained by heating a linear organopolysiloxane having the formula

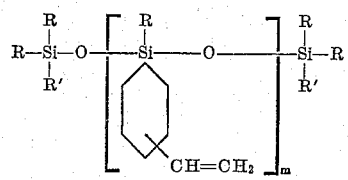

wherein R represents a monovalent hydrocarbon radical free from aliphatic unsaturation, R' represents a radical selected from the group consisting of monovalent hydrocarbon radicals free from aliphatic unsaturation and vinylphenyl radicals, and $m$ has an average value such that said linear organopolysiloxane has a viscosity within the range of from 0.1 to 5000 poises at 25° C., to a temperature of about 80° to 150° C. to cure the organopolysiloxane through the olefinically unsaturated hydrocarbon radicals thereon to a solid thermoset resin.

4. An electrical member comprising an electrical conductor and a body of solid insulation applied thereto, said insulation comprising the solid thermoset resin obtained by heating a linear organopolysiloxane having the formula

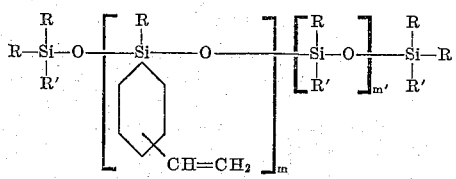

wherein R represents a monovalent hydrocarbon radical, free from aliphatic unsaturation, R' represents a radical selected from the group consisting of monovalent hydrocarbon radicals free from aliphatic unsaturation and vinylphenyl radicals, and $m$ and $m'$ each have an average value such that said linear organopolysiloxane has a viscosity within the range of from 0.1 to 5000 poises at 25° C., to a temperature of about 80° to 150° C. to cure the organopolysiloxane through the olefinically unsaturated hydrocarbon radicals thereon to a solid thermoset resin.

(References on following page).

References Cited in the file of this patent

UNITED STATES PATENTS

| | | |
|---|---|---|
| 2,469,154 | Bunnell et al. | May 3, 1949 |
| 2,486,162 | Hyde | Oct. 25, 1949 |
| 2,595,729 | Swiss et al. | May 6, 1952 |
| 2,642,415 | Winslow | June 16, 1953 |
| 2,759,959 | Frisch | Aug. 21, 1956 |

OTHER REFERENCES

Rochow: "An Introduction to the Chemistry of the Silicones," 2nd Ed. (1952), pp. 34–36 and 83, Wiley & Sons, N.Y. (publishers).